United States Patent [19]

Murphy et al.

[11] Patent Number: 5,982,516

[45] Date of Patent: Nov. 9, 1999

[54] OPTICAL NETWORK WITH WAVELENGTH-DEPENDENT ROUTING

[75] Inventors: Michael Matthew Murphy, Liverpool; Neil Richard Haigh, Eastham, both of United Kingdom

[73] Assignee: BICC Public Limited Company, London, United Kingdom

[21] Appl. No.: 08/793,323

[22] PCT Filed: Sep. 19, 1995

[86] PCT No.: PCT/GB95/02214

§ 371 Date: May 7, 1997

§ 102(e) Date: May 7, 1997

[87] PCT Pub. No.: WO96/09736

PCT Pub. Date: Mar. 28, 1996

[30] Foreign Application Priority Data

Sep. 20, 1994 [GB] United Kingdom .................... 9418946

[51] Int. Cl.[6] .............................. H04B 10/20; H04J 14/08
[52] U.S. Cl. ........................... 359/118; 359/128; 359/139; 359/165
[58] Field of Search .................... 359/118, 110, 359/127, 128, 117, 165, 130, 116, 139, 108

[56] References Cited

U.S. PATENT DOCUMENTS 4,894,818 1/1990 Fujioka et al. .............................. 370/3
5,541,756 7/1996 Chang-Hasnain et al. ............. 359/123
5,608,825 3/1997 Ip ................................................ 385/24

FOREIGN PATENT DOCUMENTS 61-49724 11/1987 Japan ..................................... 359/128

Primary Examiner—Jason Chan
Assistant Examiner—Mohammad Sedighian
Attorney, Agent, or Firm—Nath & Associates; Gary M. Nath

[57] ABSTRACT

An optical network in which data signals are encoded with a wavelength corresponding to the address of the signals includes at least one point therein, a data routing switch (1) which comprises: a wavelength comparator (3) for example a Brag grating or a notch filter that will receive data signals and has associated therewith a characteristic wavelength so that it will send the data signal along a gate enabling line (5) or not in accordance with the relationship between the data signals encoding wavelength and the characteristic wavelength of the comparator, and a gate (7) which transmits or blocks the data signal in response to the presence or absence of the data signal in the gate enabling line and a number of data routing switches having different characteristic wavelengths so that routing of the data is determined by which switch characteristic wavelength matches the data encoding wavelength. Since the wavelength comparison is a passive process, comparison and switching can be performed more rapidly than with conventional systems.

10 Claims, 3 Drawing Sheets

OPTICAL NETWORK WITH WAVELENGTH-DEPENDENT ROUTING

FIELD OF THE INVENTION

This invention relates to optical networks, and especially, although not exclusively, to telecommunications, data communication, networks and optical computing systems.

BACKGROUND OF THE INVENTION

In certain optical networks, such as passive optical networks, signals are sent along optical fibres which may, for example, include a 3 dB coupler at a node in the network so that the signals are transmitted over the entire network. In many cases, however, it would be desirable for optical signals to be routed along the network, for example in order to improve security of the system to unauthorised access to data. In electric networks, data routing typically involves reading the address of the data into a computer at a node of the network and determining the path of the data in accordance with the data address. Such a system has the disadvantage that the rate at which data can be sent along the network is limited by the speed at which the computer can perform the necessary reading and comparison operations. Even in optical networks that involve routing, the switching operates in the same manner as in electrical networks, with the result that the data rate is still limited by the computer speed. For example an optical switching matrix is described in EP-A-0 497 667 and by Jacob & Gabriagues, Communication et Transmission, Vol. 16, No. 2, 1994 pp. 5–14, in which incoming optical signals contain routing tags that are read and processed by a computer in order to assign carrier wavelengths to the signals that correspond to the signal destinations. The signals, modulated to different wavelengths corresponding to their destinations, are then sent to a space switching stage, and the signals leaving the space switching stage are filtered by optical bandpass filters in each output line to allow only those signals with the appropriate carrier wavelengths to pass.

BRIEF SUMMARY OF THE INVENTION

According to the present invention, there is provided an optical network in which data signals are transmitted along an optical line and are encoded with a wavelength corresponding to the address of the signals, and which includes, at at least one point on the optical line, a data routing switch, characterised in that the data routing switch comprises:

(i) splitter means for sending the data signals to a gate enabling line;

(ii) a wavelength comparator for receiving data signals and which has associated therewith a characteristic wavelength so that it will send the data signal along the gate enabling line or not in accordance with the relationship between the data signal encoding wavelength and the characteristic wavelength of the comparator; and (iii) an optical gate in the optical line arranged to transmit or block passage of the data signal along the optical line in response to the presence or absence of the data signal in the gate enabling line.

Preferably, the network includes a plurality of data routing switches, each of which may have a different characteristic wavelength from the or each other data routing switch. Thus, for example, a data routing switch may be incorporated in each arm of a branch in the network downstream of the branch so that passage of data through the branch is determined by which switch characteristic wavelength matches the data encoding wavelength.

The network according to the invention has the advantage that the comparison of the data address at the nodes in the network is a passive process and occurs effectively instantaneously, with the result that the comparison can be performed significantly faster than routing techniques employing computer data processing techniques. Thus, for example, data may pass through a data routing switch with a speed that is limited only by the speed of the gate (typically about 1 ps), whereas a period of about 10 ps would be required in a conventional routing arrangement.

The term "address" as used herein is not, in its broadest sense, limited to a single user terminal of the system, but may include a significant region of the network. Thus, it would be possible for the network to contain only two addresses, one for high security data which could only be received at one part of the network, and another for low security data which could be received at other parts of the network. In other designs of networks the number of addresses could be increased, and the parts of the system covered by a single address correspondingly reduced, so that, at the other extreme, one each encoding wavelength is associated with a unique user address.

Usually the routing switch will operate by the comparator sending the data signal along the gate enabling line if the address wavelength and the characteristic wavelength of the comparator are equal. In this case the data signal that is transmitted by the comparator (other than the signal in the gate enabling line, if that is possible) or bypasses the comparator, and the signal in the gate enabling line are fed into an AND gate which determines transmission or blocking of the signal by the data routing switch. The AND gate may for instance be an optical AND gate, an opto-electronic AND gate or, if both inputs are converted to electrical signals, an electronic AND gate.

The comparator may be based on any of a number of devices. For example, it may comprise an optical filter which may transmit or reflect a single wavelength or range of wavelengths e.g. a monochromatic reflecting optical filter such as a Fabry Perot etalon, or it may block light of a defined wavelength, i.e. an optical notch filter. Such a notch filter could be formed by doping a section of fibre with an appropriate absorber e.g. a rare earth metal. For example a praesodimium doped fibre will absorb at 1380 mm while an erbium doped fibre will absorb at 1480 mm. Alternatively and preferably, the comparator may comprise a Bragg grating, which will transmit the data signal and which, if the signal has the appropriate wavelength, will reflect the signal back into the gate enabling line. Such a Bragg grating may be formed in an optical fibre by shining ultraviolet light and onto parts of the fibre in order to alter the refractive index of the fibre core. If positions of the fibre that have been irradiated with ultraviolet light are separated by a distance d the grating so formed will reflect light of wavelength 2d back along the fibre. It is also possible to employ a Bragg grating as a notch filter provided the degree of contrast between the uv illuminated and unilluminated parts of the optical fibre is sufficiently large and depending on the sensitivity of the logic gate. It is preferred to use Bragg gratings as the comparator since they generally are specific to a narrow band, typically 0.1 to 1 mm. In addition, different Bragg gratings can be written into the same section of fibre so that the routing switch will allow passage of data signals having more than one encoding wavelength. Furthermore, by adjusting the degree of contrast of the grating, it is possible to minimize the power of reflected signal, thereby maximizing the power of the transmitted signal.

The form of logic required by the gate will clearly depend on the type of comparator that is used. For example, if the comparator comprises an optical notch filter, the data signal that bypasses the comparator and the data signal in the gate enabling line would be fed into an EXCLUSIVE OR gate which determines transmission or blocking of the signal in the network.

The data signals employed in the network according to the invention will comprise both data and a wavelength encoded address. Normally there will be two ways in which this may be achieved:

(i) by encoding the data with the address wavelenth; or
(ii) by incorporating an address header in the data signal that is encoded with the address wavelength and which is followed by the data (which may be at the same or a different wavelength).

The first alternative has the advantage that the construction of the routing switches for the network is particularly simple and requires very few components. Because of the fact that the entire data signal is encoded with the address wavelength the routing switch will remain open until the entire data signal has passed. However, the number of nodes or separate addresses in such a network will be limited by the number of address wavelengths that are available.

In the second option, the data signal starts with an address header that is encoded with an address wavelength, and the data, which may have a different wavelength, follows the address header. This option has the advantage that it is possible for the address header to be divided into a number of sequential parts, each of which is encoded with a different address wavelength with the result that the routing of the data signal through the network will depend not only on the address wavelength but also on the order of the different address wavelengths, so that the network can include more nodes and addresses than address wavelengths available. The construction of the routing switches to be used in this form of network is similar to the construction of the routing switches in the first alternative, but means should be provided for holding the gate open for a defined length of time after the appropriate address wavelength has been detected in order to allow the remaining parts of the data signal (which will not be encoded with the address wavelength) to pass through the switch. This can be achieved quite simply, for example, by incorporating a timer that will be actuated by opening of the gate and will send a signal lasting for one or more clock cycles to the gate.

In addition, it may be important to consider chromatic dispersion effects on the data signal in view of the fact that different parts of the data signal will have different wavelengths. This will depend on the physical size of the network and the difference in wavelength of different parts of the data signal. Clearly it is important that the data is not so delayed with respect to the address header that the routing switch closes before all the date has passed through it, or that data arrives a routing switch before the address header. Thus, for example, it may be appropriate to transmit different parts of the data signal delayed by a certain amount having regard to the distance and wavelength difference in order that the data signal is received correctly at the address and at any intervening routing switches.

Several forms of routing switch that may be employed in a network according to the invention will now be described by way of example with reference to the accompanying drawings in which:

DETAILED DESCRIPTION OF THE INVENTION

Figure 1:
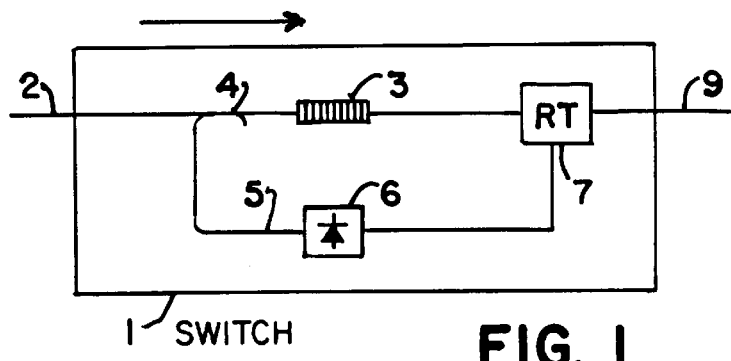
FIG. 1 shows one form of routing switch used in the network according to the invention.

Referring to the accompanying drawings, FIG. 1 shows one form of routing switch that can be employed in a passive optical network according to the invention. The switch 1 is located in an optical line 2 of the network in which, as shown in FIG. 1, optical data flows in the direction of the arrow, and comprises a Bragg grating 3 that has been formed in the optical fibre by means of ultraviolet radiation, and an optical gate 7. Upstream of the Bragg grating 3 a 3 dB coupler 4 is located so as to receive optical signals reflected back along the fibre from the Bragg grating 3 and send the reflected signals into a gate enabling line 5 whereupon a signal is detected by a photodetector 6 for example comprising a p-i-n photodiode and FET amplifier or an avalanche photodiode, and sent to the input of gate 7 in the optical line. In the case of an end user the gate 7 may be a remote terminal so that output line 9 will be an electrical line.

The Bragg grating 3 in the optical fibre may be formed in a number of ways. For example, the grating may be recorded as a hologram, and an image of the grating subsequently may beformed in the optical fibre by shining ultraviolet light through the hologram. Alternatively, a beam of ultraviolet light may be shone through a mesh having the appropriate grating printed thereon and focused onto the fibre. In yet another method, a line of ultraviolet light may be passed along a portion of the fibre at a defined speed and its intensity may be modulated at a frequency that will give the desired line spacing along the fibre. Whichever method is employed the refractive index of the optical fibre core will vary periodically in accordance with the intended line spacing. Such a fibre will transmit light over a range of wavelengths, but if the light wavelength (in vacuum) $\lambda$ is related to the line spacing d of the grating by the Bragg formula $$\lambda = 2nd$$

where n is the mean refractive index of the fibre, then part of the signal is reflected back by the grating 3 into the gate enabling line 5. If the gate 7 is normally off, the routing switch will block optical signals unless their encoding wavelength matches the Bragg grating 3, whereupon the reflected signal will cause the gate 7 to open and allow transmission of the signal. As soon as the signal has passed, absence of the signal in the gate enabling line will cause the gate to close.

The relative length of the gate enabling line 5 and any other signal pathway extending between the splitter 4 and the gate 7 will depend on the speed of propagation along the line and the delay in any of the compartments such as the photodetector 6 and the gate 7 and will be such that the gate 7 is open for the period of time that it receives the data signal arriving along the network optical line 2.

If desired, a number of gratings 3 that have different characteristic wavelengths may be written into the same section of fibre in order to allow transmission of a number of wavelengths.

Figure 2:
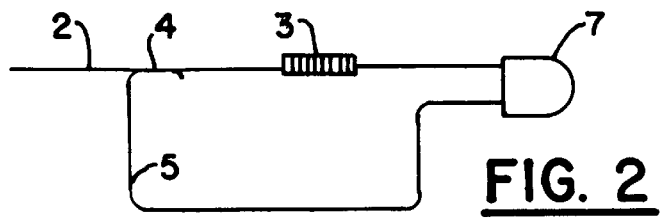
FIGS. 2 & 3 show two further forms of routing switch which employ Bragg diffraction gratings.

FIG. 2 shows a modification of the routing switch shown in FIG. 1 in which the gate 7 is in the form of an optical AND gate whose inputs are taken from the network optical line 2 and the gate enabling line 5. Thus the routing switch will be open only when the AND gate 7 receives both the direct data signal along the line 2 and the Bragg reflected signal from the gate enabling line 5.

Figure 3:
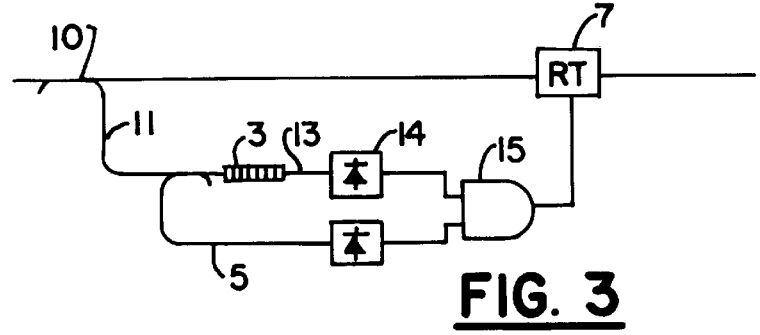

As shown in FIGS. 1 and 2 the comparator formed by the Bragg grating 3 is located in the network optical line 2. In many cases this will be advantageous in view of the reduced number of components in such an arrangement, but it is not essential that this be the case. FIG. 3 shows an arrangement which includes a coupler 10 that splits the optical signal between the network optical line 2 and a routing switch line 11. The coupler 10 may be a 3 dB coupler although it may be preferred to reduce the power of the signal tapped off, in order to increase the power of the transmitted signal. The signal then passes into the routing switch 1 that again employs a Bragg grating 3 as the comparator. In this case, however, because the comparator is not located in the network optical line 2, the transmitted output line 13 of the Bragg grating 3 may include a photodetector 14 as well as the gate enabling line 5, with the result that the transmitted and reflected signals are fed into an electrical AND gate 15 which controls the optical signal switching gate 7.

Figure 4:
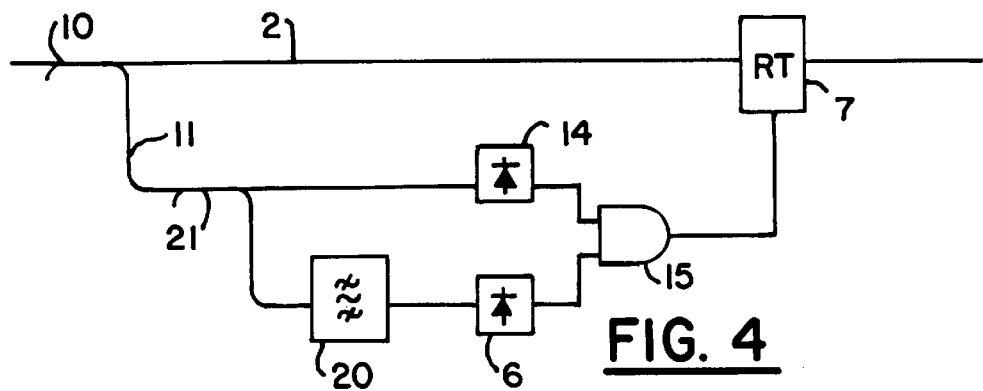
FIG. 4 shows yet another form of routing switch which employs an optical band pass filter.

Comparators other than Bragg gratings may also be employed. For example, as shown in FIG. 4 an optical band pass filter 20 is employed. In this routing switch signals received along the routing switch line 11 from 3 dB splitter 10 in the network optical line 2 are split again by a further 3 dB coupler 21 and, after being converted to electrical signals by photodetectors 6 and 14 are fed into AND gate 15, which controls the switching gate 7. In this arrangement an optical band pass filter 20 which is set to transmit a single frequency or a range of frequencies controls one of the inputs to the AND gate 15 and hence the switching gate 7.

Figure 5:
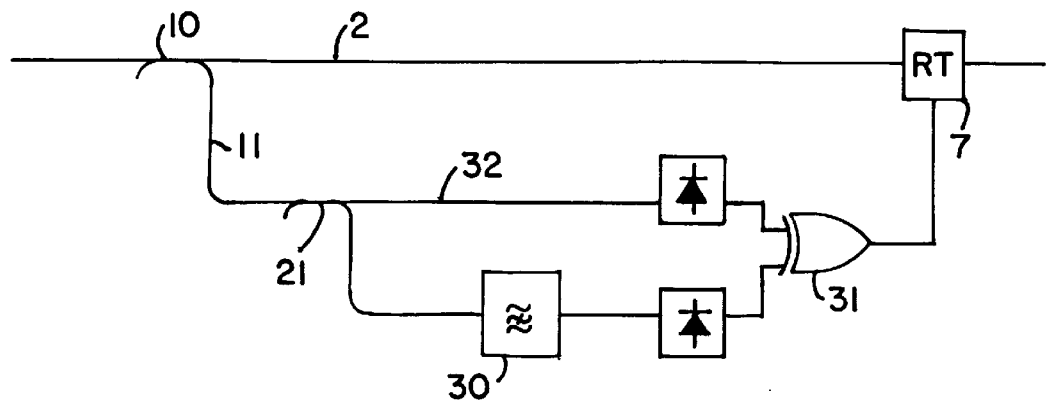
FIG. 5 shows yet another form of routing switch which employs an optical notch filter.

A similar switch which incorporates different logic is shown in FIG. 5. In this switch an optical notch filter 30 is employed, for example one having a strong absorption band at a specific wavelength. The output of the optical notch filter is fed into an EXCLUSIVE OR gate 31 after conversion to an electrical signal, and the other input of the EXCLUSIVE OR gate is taken from signal line 32 that bypasses the optical notch filter. In this case the output of gate 31 is raised high to allow switching gate 7 to allow transmission of the signal only when a data signal is detected in signal line 32 and is simultaneously blocked by the notch filter 30.

Figure 6:
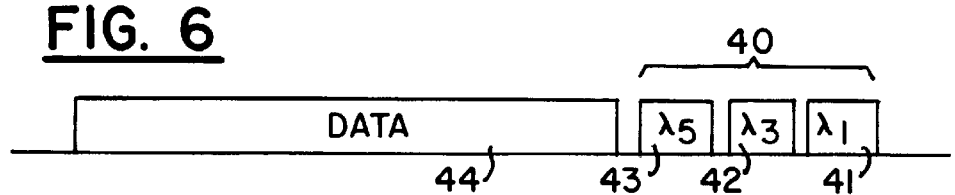
FIG. 6 shows a data packet used in a second form of network according to the invention.

FIG. 6 shows an alternative form data packet that can be used in the network according to the invention. This form of data packet has an address header 40 that is divided into three parts, 41, 42 and 43, each of which has a different wavelength $\lambda_1$, $\lambda_3$ and $\lambda_5$. Following the address header is the data message 44, which will be encoded with light of a different wavelength. The parts 41, 42 and 43 will be spaced apart sufficiently to ensure that chromatic dispersion effects will be taken into account.

Figure 7:
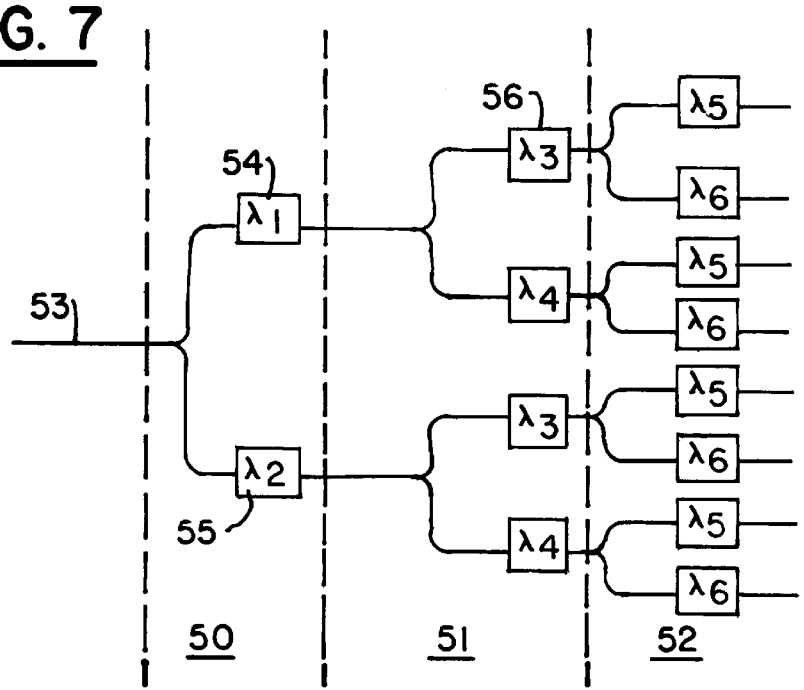
FIG. 7 shows a network that uses data packets shown in FIG. 6.

Such a data packet would be employed in a network as shown in FIG. 7. This network has three tiers of nodes 50, 51 and 52 so that data signals sent from the head end 53 will pass through three switches before being received by one of eight users. The first node 50 includes a switch 54 and 55 on each branch having a characteristic wavelength $\lambda_1$ or $\lambda_2$ which corresponds to the two possible encoding wavelengths of the first part 41 of the address header. Since the wavelength of the first part of the address header matches the characteristic wavelength of switch 54 it will pass through to arrive at the second tier of nodes with switches each having one of the two possible wavelengths $\lambda_3$ or $\lambda_4$ of the second part 42 of the address header, whereupon it will pass through switch 56 and arrive at the third tier of nodes with switches having one of the two possible wavelengths $\lambda_5$ or $\lambda_6$ of the third part 43 of the address header 40. In such a form of network having n tiers of switches, 2n different address wavelengths will be required, and the number of users will be $2^n$.

Figure 8:
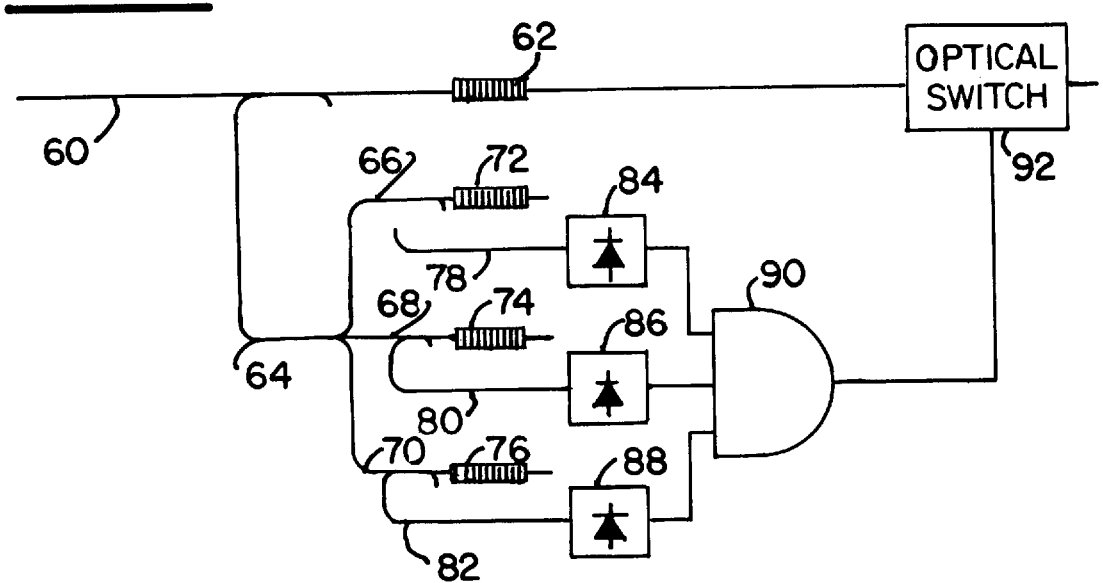
FIG. 8 shows yet another form of routing switch that may be employed in the second form of network.

A further increase in the number of users for a given number of address wavelengths can be obtained by the use of combinations of different wavelengths in the same address header. FIG. 8 shows a switch that will allow passage of a data packet only when its address header (or one part of its address header) contains three separate wavelengths. The optical line 60 contains a Bragg grating 62 that includes three different spacings corresponding to the different wavelengths of the address header. Light will be reflected back from grating 62 into a first gate enabling line 64 if it contains any of the three address wavelenghs, and will be split into three further lines 66, 68 and 70 each of which contains a Bragg grating 72, 74 or 76 that has a spacing corresponding to one of the three address wavelengths. Light is reflected back by each of the gratings 72, 74 and 76 into one of three second gate enabling lines 78, 80 and 82 and converted into electrical signals by photodetectors 84, 86 and 88 before being fed into a three input AND gate 90. The output of the AND gate 90 controls an optical switch 92 in the line. In this case, only when the address header of the data packet contains address wavelengths corresponding to all three gratings 72, 74 and 76 will the output of the AND gate go high and allow the data packet to pass. By the use of other conventional logic gates in place of AND gate 90, data packets having any combination of the three address wavelengths can be switched.

We claim:

1. An optical network in which data signals are transmitted along an optical line (2) and are encoded with a wavelength corresponding to the address of the signals, and which includes, at at least one point on the optical line (2), a data routing switch, characterised in that the data routing switch comprises:

(i) splitter means (4,10,21) for sending the data signals to a gate enabling line (5);

(ii) a wavelength comparator (3,20,30) for receiving, data signals and which has associated therewith a characteristic wavelength so that it will send the data signals along the gate enabling line or not in accordance with the relationship between the data signal encoding wavelength and the characteristic wavelength of the comparator; and (iii) an optical gate (7) in the optical line (2) arranged to transmit or block passage of the data signal along the optical line (2) in response to the presence or absence of the data signal in the gate enabling line.

2. A network as claimed in claim 1, which includes a plurality of data routing switches each of which has a different characteristic wavelength from the or each other data routing switch.

3. A network as claimed in claim 2, wherein each encoding wavelength is associated with a unique user address.

4. A network as claimed in claim 1, wherein the comparator (3,20) will send the data signals along the gate enabling line if the data signals encoding wavelength and the characteristic wavelength of the comparator are equal.

5. A network as claimed in claim 4, wherein the comparator comprises a Bragg grating, a Fabry Perot etalon, or an optical notch filter.

6. A network as claimed in claim 4, wherein the comparator (3) is located in the optical line (2) of the network.

7. A network as claimed in claim 4, wherein:
(i) the splitter means comprises a first splitter (10) for splitting the data signals on the optical line between the optical line (2) and a routing switch line (11), and a second splitter (21) for splitting the data signals on the routing switch line between the gate enabling line (5) and a second optical line (13), the comparator being located on one of the gate enabling line or the second optical line; and
(ii) the data routing switch includes an AND gate (15) for receiving electrical signals from the gate enabling line and the second line and whose output is arranged to control the optical gate (7).

8. A network as claimed in claim 7, wherein the data routing switch includes means on the gate enabling line and on the second optical line for converting optical signals to electricl signals, and the AND gate is an electronic AND gate.

9. A network as claimed in claim 1, wherein
(i) the splitter means comprises a first splitter (10) for splitting the data signals on the optical line (2) between the optical line and a routing switch line (11), and a second splitter (21) for splitting the data signals on the routing switch line between the gate enabling line and a second optical line (32), the comparator being located on the gate enabling line;
(ii) the comparator (30) comprises an optical notch filter; and
(iii) the data routing switch includes an EXCLUSIVE OR gate (31) for receiving the electrical signals from the gate enabling line and the second line and whose output is arranged to control the optical gate.

10. A network as claimed in claim 9, wherein the data routing switch includes means on the gate enabling line and on the second optical line for converting optical signals to electrical signals, and the EXCLUSIVE OR gate is an electronic EXCLUSIVE OR gate.

\* \* \* \* \*